(12) United States Patent
Felchner et al.

(10) Patent No.: US 8,544,591 B2
(45) Date of Patent: Oct. 1, 2013

(54) BEARING DEVICE FOR THE VIBRATION-DECOUPLED ROTATABLE SUPPORT OF AN INTERMEDIATE SHAFT ON THE ENGINE BLOCK OF A MOTOR VEHICLE, AND METHOD FOR THE VIBRATION-DECOUPLED ROTATABLE SUPPORT OF AN INTERMEDIATE SHAFT ON THE ENGINE BLOCK OF A MOTOR VEHICLE

(75) Inventors: Christian Felchner, Rernscheid (DE); Ole Biskup, Hürth (DE); Luis Höks, Eschweiler (DE)

(73) Assignee: Neapco Europe GmbH, Duren (DE)

( * ) Notice: Subject to any disclaimer, the term of this patent is extended or adjusted under 35 U.S.C. 154(b) by 0 days.

(21) Appl. No.: 12/558,670

(22) Filed: Sep. 14, 2009

(65) Prior Publication Data

US 2010/0065364 A1    Mar. 18, 2010

Related U.S. Application Data

(63) Continuation of application No. PCT/EP2008/052327, filed on Feb. 26, 2008.

(30) Foreign Application Priority Data

Mar. 14, 2007    (DE) .................. 10 2007 012 958

(51) Int. Cl.
*B60K 17/24*    (2006.01)
(52) U.S. Cl.
USPC ........... 180/381; 180/312; 180/382; 384/536; 384/542
(58) Field of Classification Search
USPC .................. 180/381, 312, 382; 384/536, 542
See application file for complete search history.

(56) References Cited

U.S. PATENT DOCUMENTS

| | | | | |
|---|---|---|---|---|
| 2,102,415 | A | * | 12/1937 | Herreshoff .................... 384/536 |
| 3,003,831 | A | | 10/1961 | King et al. |
| 3,428,372 | A | * | 2/1969 | Keller et al. .................. 384/536 |
| 3,873,167 | A | * | 3/1975 | Anderson ..................... 384/495 |

(Continued)

FOREIGN PATENT DOCUMENTS

DE    3446518 A    7/1986

OTHER PUBLICATIONS

International Search Report from PCT/EP2008/052327 mailed Jun. 19, 2008.

*Primary Examiner* — Joseph Rocca
*Assistant Examiner* — George Spisich
(74) *Attorney, Agent, or Firm* — Summa, Additon & Ashe, P.A.

(57) ABSTRACT

The subject matter of the present invention is a bearing device for the vibrationally decoupled rotary mounting of an intermediate shaft on the engine block of a motor vehicle. It has the following features:

Figure 1:
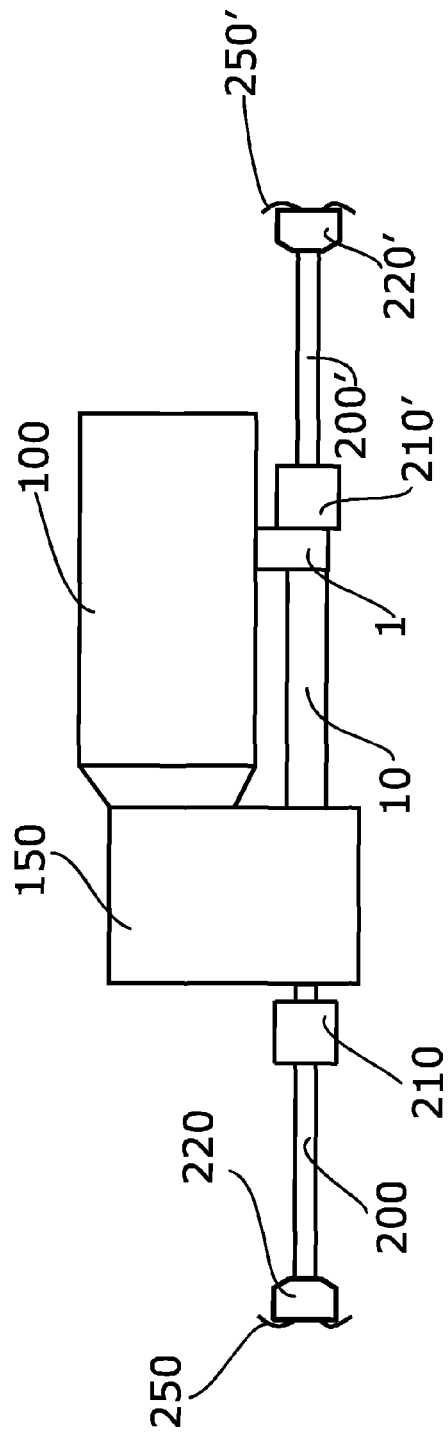

a. a radial bearing with an inner ring for accommodating the intermediate shaft, and an outer ring, b. a bearing housing provided for attachment on the engine block of the motor vehicle and for accommodating the radial bearing in a non-rotatable manner, and which forms a mechanical interface for the attachment of the bearing housing on the engine block of the motor vehicle, wherein the bearing device further comprises at least one rubber-elastic damper member provided to be disposed in a vibration-damping way between the bearing housing and the engine block when the bearing housing is mounted on the engine block.

17 Claims, 5 Drawing Sheets

(56) References Cited

U.S. PATENT DOCUMENTS

| | | | | |
|---|---|---|---|---|
| 4,413,701 A | * | 11/1983 | Kumagai | 180/256 |
| 4,421,187 A | * | 12/1983 | Shibata et al. | 180/375 |
| 4,648,475 A | * | 3/1987 | Veglia | 180/297 |
| 4,796,722 A | * | 1/1989 | Kumagai | 180/297 |
| 5,501,531 A | * | 3/1996 | Hamaekers | 384/536 |
| 5,988,341 A | * | 11/1999 | Allen et al. | 192/110 B |
| 6,129,328 A | * | 10/2000 | Knurek et al. | 248/638 |
| 6,450,474 B1 | * | 9/2002 | Bucksbee | 248/638 |
| 6,540,042 B2 | * | 4/2003 | Hamaekers et al. | 180/300 |
| 6,585,223 B1 | * | 7/2003 | VanDenberg | 248/635 |
| 6,863,443 B2 | * | 3/2005 | Mahling | 384/536 |
| 2002/0171012 A1 | * | 11/2002 | Boutin | 248/60 |
| 2004/0011584 A1 | * | 1/2004 | Henkel et al. | 180/312 |

* cited by examiner

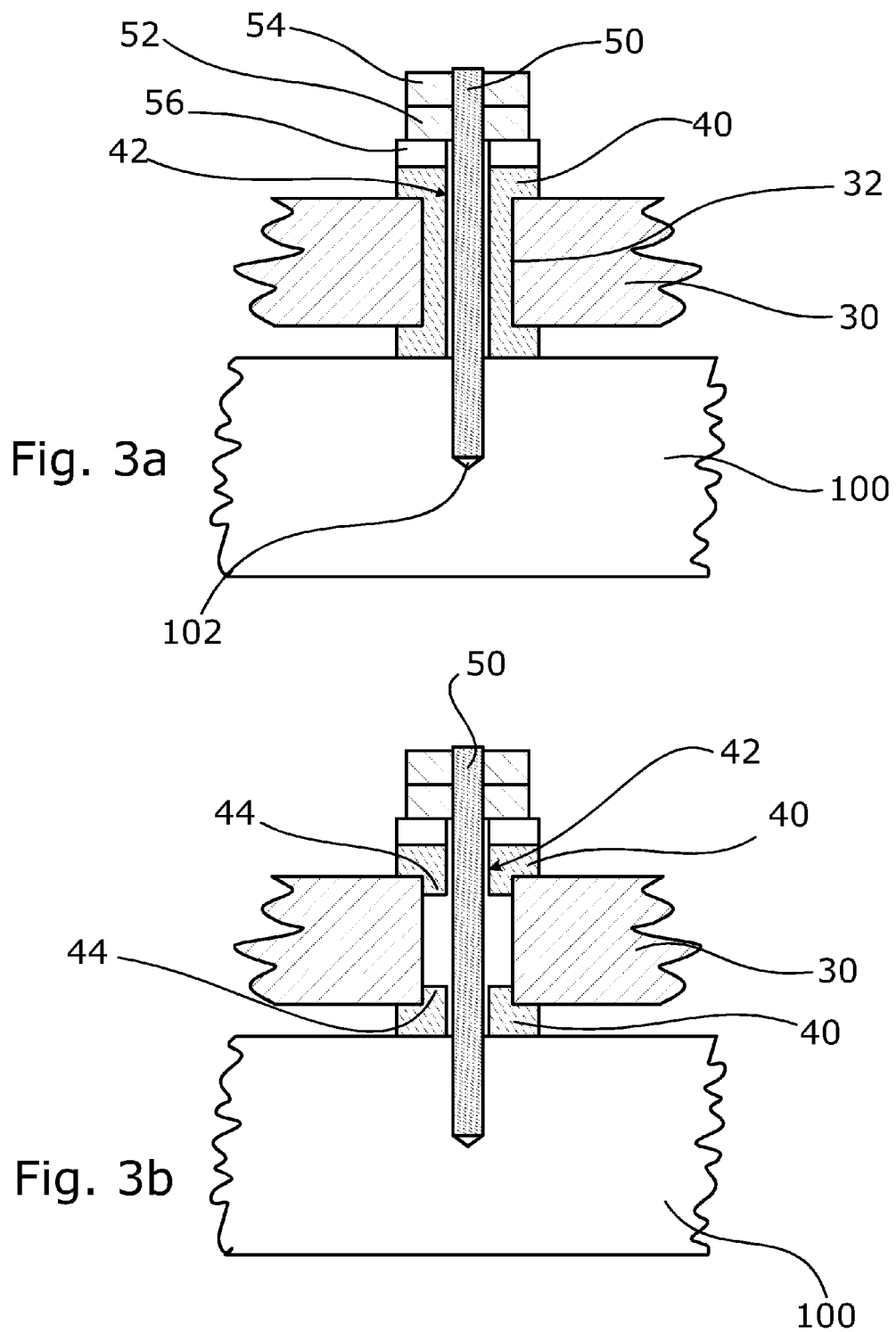

BEARING DEVICE FOR THE VIBRATION-DECOUPLED ROTATABLE SUPPORT OF AN INTERMEDIATE SHAFT ON THE ENGINE BLOCK OF A MOTOR VEHICLE, AND METHOD FOR THE VIBRATION-DECOUPLED ROTATABLE SUPPORT OF AN INTERMEDIATE SHAFT ON THE ENGINE BLOCK OF A MOTOR VEHICLE

This application hereby claims the benefit of the commonly assigned German Patent No. 102007012958.2(filed Mar. 14, 2007, in the German Patent Office) and the commonly assigned International Patent Application No. PCT/EP2008/052327(filed Feb. 26, 2008, in the European Patent Office), both of which are hereby incorporated by reference in their entirety.

The subject matter of the present invention is a bearing device for the vibrationally decoupled rotary mounting of an intermediate shaft on the engine block of a motor vehicle and a method for such a rotary mounting.

The present application generally relates to the area of the drive train in a motor vehicle, in this case primarily a motor vehicle with driven front wheels in which the engine is mounted transversely. In such motor vehicle, there is the problem that the front axle differential cannot be installed centrically. The immediate consequence of this is that the drive shafts fitted between the differential transmission and the driven front wheels must have different lengths as a matter of principle. This has proven to be a disadvantage in particular in high-torque engines, because differently dimensioned right and left drive shafts have different mechanical properties, in particular with regard to their torsional stiffness. This becomes apparent in a negative way with regard to the driving characteristics of the motor vehicle in the case of, for example, rapid acceleration. For this reason, right and left drive shafts having identical dimensions are being installed in current motor vehicles, with an intermediate shaft being fitted between one of the two drive shafts and the differential transmission for length compensation of the offset caused by the eccentric installation of the differential transmission. This intermediate shaft is in this case mounted rotatably on the engine block of the motor vehicle, so that it is not moved relative to the axis of rotation of the differential transmission in case of spring-like movements of the driven front wheels of the motor vehicle (in contrast to the drive shafts). It can therefore be dimensioned correspondingly generously, whereby a very high torsional stiffness is achieved. It is possible with the aforementioned construction to ensure practically identical torsional characteristics on the right and on the left side, despite the different dimensions of the drive or intermediate shafts fitted between the driven front wheels and the differential transmission, so that there is no negative effect on the driving characteristics of the motor vehicle, for example during rapid acceleration, even in the case of high-torque engines.

However, the rotary mounting of the intermediate shaft on the engine block has proven to give rise to problems in such a construction. In conventional constructions, bearing devices are being used which comprise a radial bearing, in the inner ring of which the intermediate shaft is rotatably mounted. The outer ring of the radial bearing is accommodated in a bearing housing comprising an interface for rigid attachment on the engine block of the motor vehicle. To avoid unwanted vibrations of the intermediate shaft that may be the source for audible noise and thus adversely affect the NVH behavior (noise, vibration, harshness) of the entire vehicle, a first conventional design principle states that the bearing device must be configured to be as rigid as possible in order to shift the spectrum of natural frequencies of the vibratory system resulting in this case (consisting of the engine block including the transmission, the intermediate shaft, the drive shaft and the drive wheel) into such high frequency range which is practically not perceptible anymore for human hearing. Such a mounting, however, is disadvantageous in that assembly errors in the radial bearing, which occur not infrequently, cause a dramatic shortening of the life of the radial bearing, thus requiring cost-intensive repair work on the vehicle within a short space of time.

In an alternative approach, a bearing device, which is configured to be as rigid as possible and which also comprises a radial bearing and a bearing housing, is therefore developed in such a way that the outer ring of the radial bearing in the bearing housing can execute a wobbling movement about two axes which are perpendicular to each other, and which themselves are oriented perpendicularly relative to the axis of rotation of the intermediate shaft. Though this construction obtains improved results with respect to the life of the radial bearings installed in the bearing device, it entails a significantly increased processing effort, due to the wobble-capable mounting of the radial bearing in the bearing housing, and is therefore disadvantageous as regards costs.

Another alternative approach consists of mounting the intermediate shaft in a vibrationally decoupled way on the engine block of the motor vehicle. In this regard, the prior art proposes to dispose a radial bearing, the inner ring of which accommodates the intermediate shaft, in a bearing housing which is rigidly connected with the engine block of the motor vehicle. Vibration decoupling between the intermediate shaft and the engine block is accomplished by the outer ring of the radial bearing used being vulcanized into a rubber ring, which in turn is fixed in the bearing housing by positive fit or force fit. Though this constructive approach does accomplish an advantageous acoustic effect, it entails drawbacks with regard to costs, on the one hand, because vulcanizing the outer ring of the radial bearing into a rubber-elastic material with a sufficient resistance against temperature and oil entails high costs, on the other hand, it has proven difficult to ensure a connection of the rubber ring vulcanized onto the outer ring of the radial bearing that lasts for the entire life of a vehicle.

It is therefore the object of the invention to specify a bearing device for the vibrationally decoupled rotary mounting of an intermediate shaft on the engine block of a motor vehicle which avoids the aforementioned drawbacks. Furthermore, it is the object of the invention to specify a method for the vibrationally decoupled rotary mounting of an intermediate shaft on the engine block of a motor vehicle which has advantages over the methods known from the prior art.

This object is accomplished by a bearing device having the features of claim 1 and a method having the features of claim 14.

A bearing device according to the invention for the vibrationally decoupled rotary mounting of an intermediate shaft on the engine block of a motor vehicle or on another component of the motor vehicle has a radial bearing comprising an inner ring and an outer ring, wherein the intermediate shaft to be mounted is accommodated by the inner ring of the radial bearing. Furthermore, the bearing device comprises a bearing housing provided for direct or indirect attachment on the engine block of the motor vehicle or on another component of the motor vehicle, such as the transmission case. Moreover, the bearing housing is provided for accommodating the radial bearing in a non-rotatable manner. Finally, the bearing housing forms a mechanical interface for attaching the bearing housing on the engine block of the motor vehicle or on another component of the motor vehicle. Here, this interfaces can be configured such that the bearing housing can be attached directly, i.e. without interposition of other mechanical elements, on the engine block of the motor vehicle, or can be attached indirectly, i.e. with the interposition of other mechanical elements, such as, for example, a bearing housing bracket as it is described in more detail within the context of a subsequent exemplary embodiment.

According to the invention, the bearing device comprises at least one, for example, rubber-elastic, damper member provided to be disposed in a vibration-damping way between the bearing housing and the engine block when the bearing housing is mounted on the engine block of the motor vehicle.

By replacing the rubber-elastic coating of the outer ring of the radial bearing known from the prior art with a rubber-elastic damper member, which is not disposed between the outer ring of the radial bearing and the bearing housing, but rather between the bearing housing and the engine block or another part of the motor vehicle on which the bearing housing of the bearing device is fixed, the rubber-elastic damper member can be configured in the most simple manner. On the one hand, the shaping of the rubber-elastic damper member can be chosen freely to a large extent, on the other hand, the rubber-elastic damper member must be vulcanized onto further elements of the bearing device so as to be non-undetachable and permanently stable. Significant advantages with regard to cost can thereby be achieved over the rubber-elastic mounting of the radial bearing in the bearing housing of the bearing device known from the prior art.

As regards the vibrations, particular advantages result from incorporating the damper member completely into the power train between the bearing housing and the engine block when the bearing housing is mounted on the engine block of the motor vehicle or on another part of the motor vehicle. This is realized in particular if a support of the bearing housing on the engine block by means of mechanical components other than the damper member is completely avoided. Within the context of the exemplary embodiments, various embodiments of damper members are discussed in which the entire power train between the bearing housing and the engine block extends via the damper member.

In a first preferred embodiment of the bearing device according to the invention, the bearing device comprises at least one first through bore provided to accommodate an assembly bolt, for example a machine screw with a hexagon or Allen head, for fixing the bearing housing on the engine block, when the bearing housing is mounted on the engine block. The damper member to be provided according to the invention is then advantageously disposed in the first through bore in the bearing housing. In particular, the damper member can itself comprise a second through bore, which in turn is provided for accommodating an assembly bolt when the bearing housing is mounted on the engine block. In a particularly preferred embodiment, the damper member is therefore disposed in the first through bore of the bearing housing, and itself forms a second through bore extending coaxially with the first through bore in the bearing housing, in which second through bore the assembly bolt is accommodated when the bearing housing is mounted on the engine block.

A particularly simple structure of the bearing device according to the invention results when the outer ring of the radial bearing is fixed in a force fit in the bearing housing. For example, the outer ring of the radial bearing can comprise a cylindrical outer circumferential surface pressed into a cylindrical recess in the bearing housing. In order to secure the outer ring of the radial bearing in the bearing housing, a securing element can be provided additionally which fixes the outer ring in the axial direction in the bearing housing.

The bearing housing according to the invention advantageously can be manufactured from metallic materials by means of casting processes, wherein steel and aluminum, in particular, can be used as, materials. If the bearing housing is manufactured by means of precision casting, every subsequent shaping processing step can potentially be dispensed with.

In another preferred embodiment, the bearing device according to the invention further comprises a bearing housing bracket, which itself forms a first mechanical interface for attaching the bearing housing bracket on the engine block of the motor vehicle or on another component of the motor vehicle. Moreover, the bearing housing bracket forms a second mechanical interface for attaching the bearing housing on the bearing housing bracket. The at least one damper member to be provided according to the invention is provided, in this embodiment, to be disposed in a vibration-damping way between the bearing housing and the bearing housing bracket when the bearing housing is mounted on the engine block of the motor vehicle or on another component of the motor vehicle. In a less advantageous, but nevertheless technically possible embodiment of the bearing device according to the invention, which in addition to a bearing housing also comprises a bearing housing bracket, the at least one damper member is provided to be disposed in a vibration-damping way between the bearing housing bracket and the engine block when the bearing housing is mounted on the engine block of the motor vehicle.

The arrangement of the at least one damper member between the bearing housing and the bearing housing bracket, which is considered preferred, in particular has the advantage that, by interposing a bearing housing bracket between the bearing housing and the engine block of the motor vehicle, a certain thermal decoupling of the bearing housing from the engine block can be obtained, whereby the heat input into the rubber-elastic damper member from the engine block can be significantly reduced. Therefore, this embodiment has further advantages with regard to the durability of the rubber-elastic damper member.

In another preferred embodiment of the bearing device according to the invention, the bearing housing is formed in two parts. In that case, the outer ring of the radial bearing can be fixed in a positive fit in the bearing housing. On the one hand, this embodiment of the bearing housing is advantageous in that smaller manufacturing tolerances are required than in the embodiment of the bearing housing in which the outer ring of the radial bearing is fixed in the bearing housing by press fit. Advantages with regard to costs can thus be realized. Moreover, advantages with respect to the mountability of the intermediate shaft during the fabrication of the motor vehicle may result, because the radial bearing does not have to be passed through a through bore in the bearing housing in the direction of rotation of the intermediate shaft after the connecting shaft has been inserted into the inner ring of the radial bearing, which can be difficult due to the limited space available underneath a motor vehicle. Rather, the connecting shaft can be guided towards the transmission of the motor vehicle and its engine block in an assembly direction which is substantially vertical to its direction of rotation, and the radial bearing can then be secured on the part of the bearing housing already connected firmly with the engine block of the motor vehicle by throwing a retaining clip over the outer ring of the radial bearing.

In another preferred embodiment of the bearing device according to the invention, the bearing housing and the outer ring of the radial bearing are configured such that the radial bearing fixed in the bearing housing is able to execute a wobbling movement about an axis, preferably two axes. In this case, these two axes can be oriented, in particular, perpendicularly relative to the axis of rotation of the connecting shaft. This embodiment of the bearing device according to the invention permits the further improvement of the angular tolerance, which is rather good, anyway, whereby the durability of the radial bearing provided in the bearing device can be further increased.

It has proven advantageous if the damper member according to the invention has a hardness which lies in the interval of between 10 and 100 shore A. Preferably, the hardness lies in the interval between 20 and 60 shore A. The hardness of the damper member according to the invention to be selected for a given motor vehicle in this case depends especially on the conditions of the vibratory system consisting of engine block, transmission, connecting shaft including bearing device, drive shaft, wheel suspension and drive wheel. One possible vibration-related approach which has a positive effect on the NVH behavior of the aforementioned vibratory system, lies in shifting the first natural frequency of the above-mentioned vibratory system in such a way that it lies in the range of infrasound which is not, or only weakly, perceptible for human hearing. Therefore, the first natural frequency should preferably be lower than 50 Hz, particularly preferably below 30 Hz.

An alternative approach, which may, in particular, be taken if an appropriate shift of the first natural frequency of the aforementioned vibratory system into the above-mentioned frequency range is not possible due to the conditions in the vehicle, consists of selecting the damping characteristics of the damper member such that the resulting maximum vibration amplitude of the aforementioned vibratory system is so small that no audible acoustic interferences are transmitted onto the body of the vehicle, so that the acoustic interferences caused by the vibrations, in particular of the intermediate shaft, lie below the perceptibility threshold of the passengers of the vehicle.

Finally, it is also possible to lower the first natural frequency of the aforementioned vibratory system at least so far that the lowest excitation frequency caused by the running engine of the motor vehicle, which occurs, as a rule, when the engine (for example, an internal combustion engine) runs idle, lies so far above the first natural frequency of the vibratory system that no relevant excitation of the first natural frequency occurs any more. This tuning of the first natural frequency of the aforementioned vibratory system can also be influenced by the selection of the rubber-elastic damper member, in particular by its hardness, i.e. the spring constant, and by its inherent damping.

To ensure a durability of the bearing device according to the invention over at least substantial parts of the life of a motor vehicle, it has proven advantageous if the damper member itself is temperature-resistant to at least 160° C., preferably, however, to 180° C. and above. Moreover, the damper member should exhibit good resistance against the contaminants in the engine compartment that can be found in a motor vehicle with an internal combustion engine, such as motor oil, fuel for the internal combustion engine, brake fluid etc.

The method according to the invention for the vibrationally decoupled rotary mounting of an intermediate shaft on the engine block of a motor vehicle or on another component of a motor vehicle comprises the following process steps:

a) providing a bearing device, which comprises the following:

I) a radial bearing with an inner ring for accommodating the intermediate shaft, and with an outer ring, II) a bearing housing provided for attachment on the engine block of the motor vehicle or on another component of the motor vehicle, and which is further provided for accommodating the radial bearing in a non-rotatable manner, wherein the bearing housing forms a mechanical interface for attachment on the engine block or on another component of the motor vehicle, and III) at least one, for example, rubber-elastic damper member.

b) In the subsequent process step, the bearing housing of the bearing device is mounted on the engine block of the motor vehicle or on another component of the motor vehicle, wherein the at least one damper member is disposed in a vibration-damping way between the bearing housing and the bearing housing bracket.

With regard to the arrangement of the damper member between the bearing housing and the engine block, reference is made to the explanations relating to the bearing device according to the invention, as well as concerning other advantageous embodiment of the bearing device provided in process step a).

Another advantageous embodiment of the method according to the invention relates to the selection of a suitable rubber-elastic element for a given motor vehicle, which is advantageously made in such a way that the first natural frequency of the vibratory system consisting of engine, transmission, connecting shaft including the bearing device according to the invention, drive shaft, wheel suspension and drive wheel, lies in the infrasound range. However, the first natural frequency of the aforementioned vibratory system should at least lie significantly below the lowest excitation frequency generated by the engine of the motor vehicle, which, as a rule, will be designed as an internal combustion engine.

Other advantages and features become apparent from the exemplary embodiments which will hereafter be explained with reference to the drawings. In the drawings:

FIG. 1: shows a schematic representation of an engine block including that transmission of the motor vehicle with connected drive shafts and a connecting shaft.

Figure 2B:
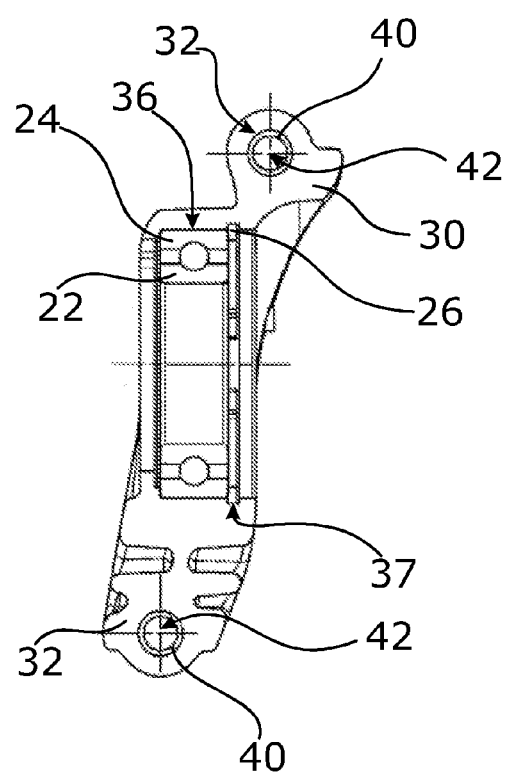
Figure 2A:
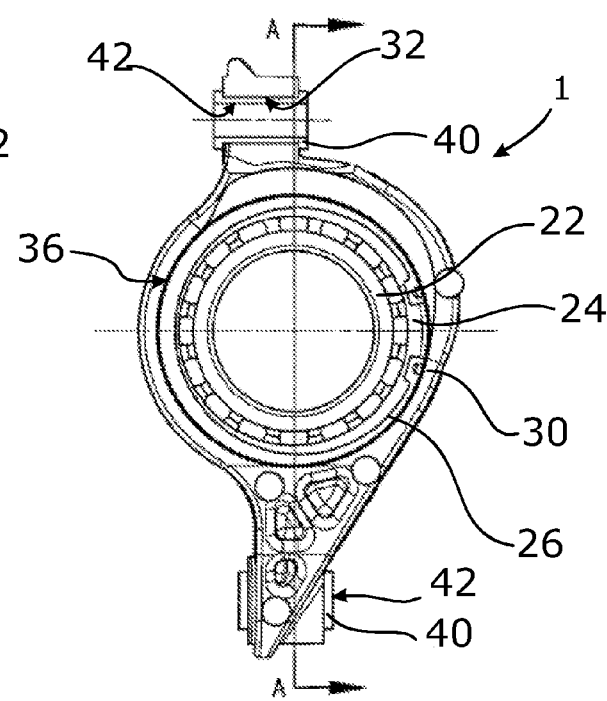

FIG. 2a: shows a section through a first preferred embodiment of a bearing device according to the invention.

Figure 4A:
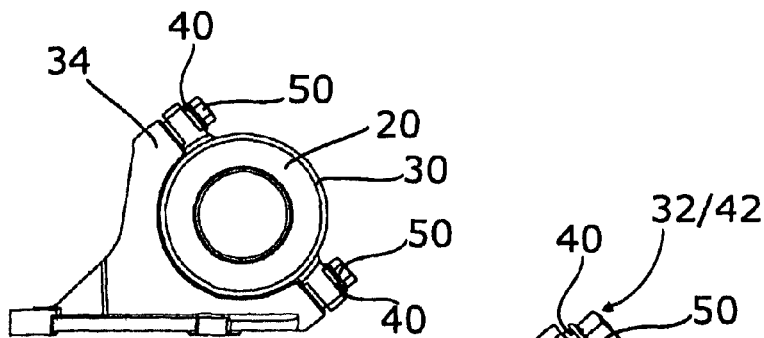

FIG. 2b: shows an orthogonal section through the bearing device according to FIG. 2a, FIG. 3a: shows an enlarged view of a section through a first embodiment of a damper member, FIG. 3b: shows an enlarged view of a section through a second embodiment of a damper member, FIG. 4a: shows a schematic representation of second exemplary embodiment of a bearing device according to the invention in a side view.

Figure 4B:
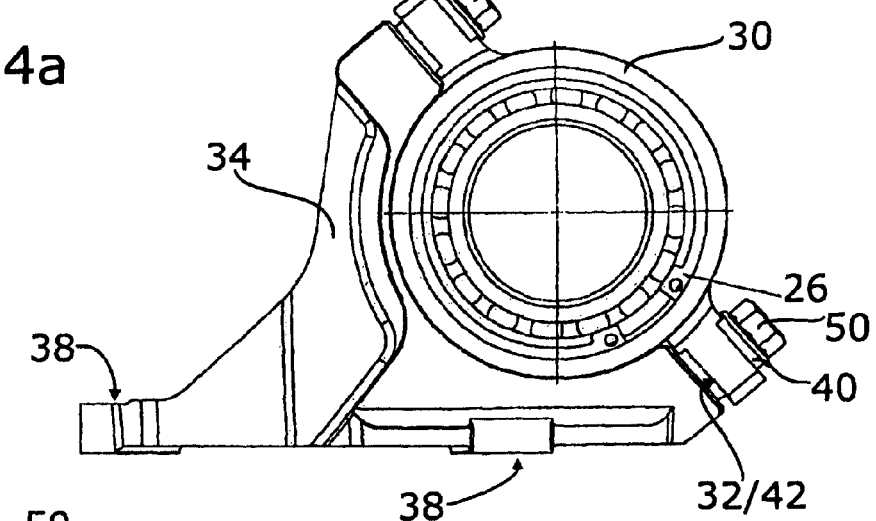

FIG. 4b: shows the view of FIG. 4a in an enlarged view, and

Figure 4C:
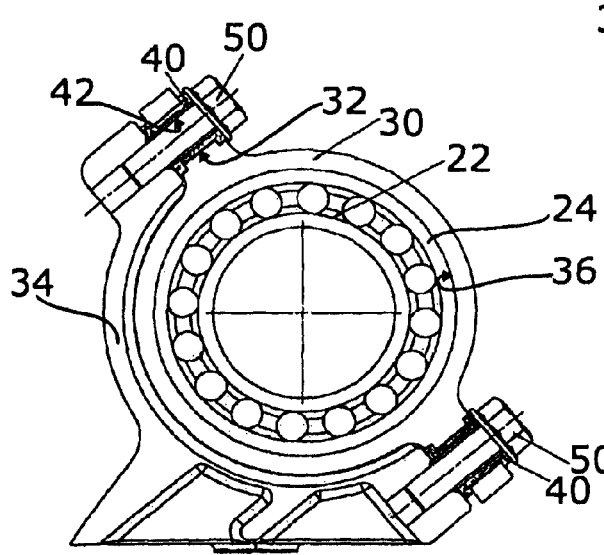

FIG. 4c: shows a section through the exemplary embodiment according to FIGS. 4a and 4b.

Figure 5:
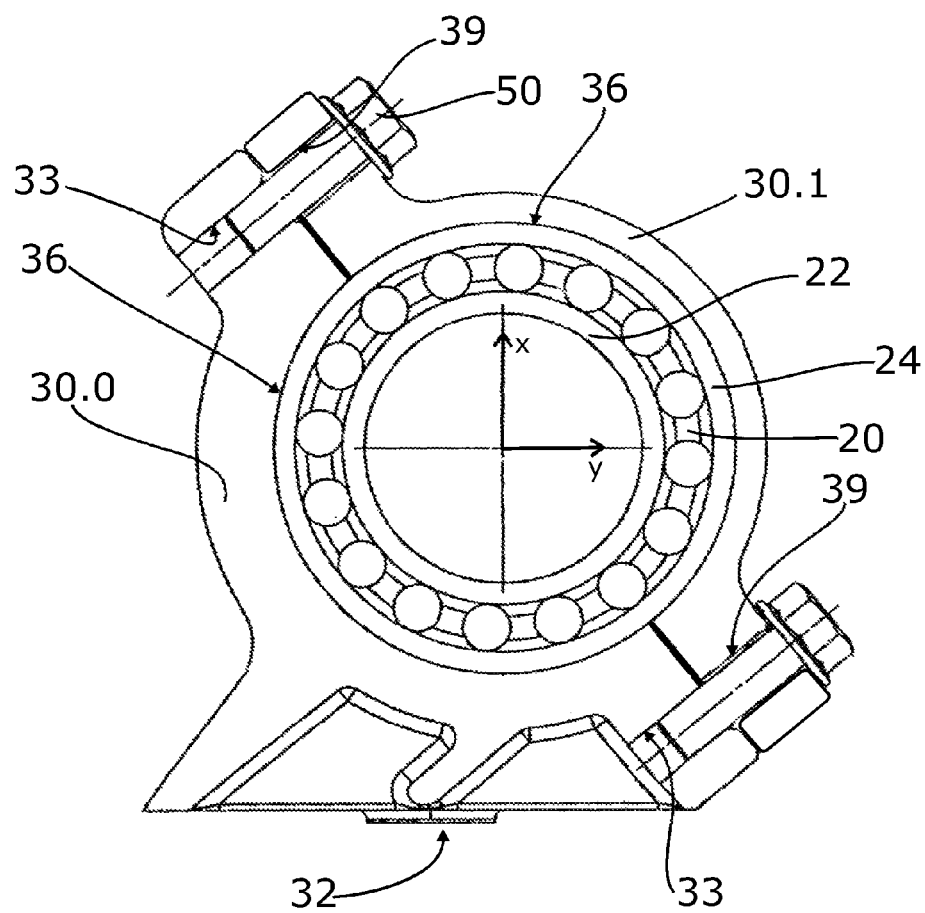

FIG. 5: shows a third exemplary embodiment of a bearing device according to the invention.

FIG. 1 shows a schematic representation of the front axle of a front-wheel driven vehicle. The transmission case 150, in which a front axle differential (not shown) is disposed, is adjacent to the engine block 100. On the left-hand side, a left-hand drive shaft 200, which is connected to the front axle differential by means of a slip joint 210, is adjacent to the left drive shaft. On the outward end, the left drive shaft 200 has a constant velocity joint 220, which forms a non-rotatable bendable connection with the drive wheel 250.

To be able to use an identically dimensioned right-hand drive shaft 200' on the right-hand side, an intermediate shaft 10 must be fitted between the right-hand drive shaft 200' and the right-hand output of the front axle differential. The intermediate shaft 10 is non-rotatably connected, for example, by means of a spline connection, with the right-hand output of the front axle differential. On its outward end, the intermediate shaft 10 is mounted rotatably on the engine block 100 in a bearing device 1, and is connected non-rotatably by means of a right-hand slip joint 210' with the right-hand drive shaft 200', the structure of which matches that of the left-hand drive shaft 200. Because the intermediate shaft 10 is connected substantially rigidly with the front axle differential and the engine block 100 of the motor vehicle, that is, does not have to execute bending movements during the operation of the motor vehicle, the intermediate shaft can be dimensioned significantly more generously than the drive shafts 200. 200', as was already explained in the introductory part. It can thus be ensured that the torsional properties of the coupled system consisting of the intermediate shaft 10 and the right drive shaft 200' substantially correspond to the torsional properties of the left drive shaft 200, so that there is no negative effect on the driving characteristics of the motor vehicle, for example during rapid acceleration.

FIG. 2a shows a first exemplary embodiment of a bearing device 1 according to the invention by means of which the intermediate shaft 10 can be mounted in a vibrationally decoupled way on the engine block 100 of the motor vehicle. The bearing device 1 comprises an integrally formed bearing housing 30 which may consist, for example, of cast steel. The bearing housing 30 has a cylindrical accommodating recess 36 into which the outer ring 24 of the radial bearing 20 is pressed. The outer ring 24 is secured in the axial direction by a securing element 26 formed as a spring washer, which latches into an annular groove 37 formed in an inner circumferential surface of the accommodating recess 36. In this case, the radial bearing 20 is formed as a grooved ball bearing, with the inner ring 22 of the radial bearing 20 being provided to accommodate the intermediate shaft 10 within itself.

For mounting the bearing device 1 on the engine block 100 of the motor vehicle, the bearing device 1 forms an interface, which in the exemplary embodiment shown consists of two first through bores 32 oriented orthogonally relative to the axis of rotation of the intermediate shaft 100. These first through bores 32 are provided to accommodate assembly bolts 50, when the bearing device 1 is mounted, by means of which the bearing housing 30 of the bearing device 1 can be bolted to the engine block 100.

In order to realize the vibrationally decoupled mounting of the intermediate shaft 10 on the engine block 100 to be realized according to the invention, damper members 40 are fitted into the first through bores 32 of the bearing housing 30. These damper members 40 are configured sleeve-shaped and consist of a rubber-elastic material, the hardness of which preferably lies in the range of between 20 and 60 shore A, and which has a temperature resistance of 160° C. or better. The damper members 40 formed sleeve-shaped themselves form a second through bore 42, which in the mounted state are oriented coaxially with the first through bores 32 in the bearing housing 30. When the bearing device according to the invention is mounted on the engine block 100 of the motor vehicle, assembly bolts 50 are passed through the second through bores 42 and bolted to the engine block 100. In the process, attention must be paid that the damper members 40 are not subjected to a compression which is too large, so that a direct mechanical contact between the assembly bolts 50 and the bearing housing 30 on the one hand, and the bearing housing 30 and the engine block 100 on the other hand is safely avoided. In this configuration, the damper members 40 are then completely incorporated into the power train between the bearing housing 30 and the engine block 100. Since the assembly bolt 50 must not be subjected to a tightening torque that is too large, it may be technically useful if the assembly bolts 50 are provided with self-securing properties, so that, from a certain penetration depth into the engine block 100, they are subjected to a sufficient securing force against inadvertent loosening. Basically, all possibilities for securing the assembly bolts 50 on the engine block 100 known from the prior art are available.

FIG. 2b again shows the first exemplary embodiment according to FIG. 2a in a section along the plane A-A from FIG. 2a, from which the arrangement of the radial bearing 20 in the accommodating recess 36 of the bearing housing 30 becomes clear. The arrangement of the securing ring in the annular groove 37 is also clearly discernible. Moreover, the coaxial arrangement of the first and second through bores 32, 42 in the bearing housing 30 and in the damper members 40, respectively, which are disposed in the first through bores 32 of the bearing housing 30, is apparent from FIG. 2b.

FIG. 3a, in a further enlargement, shows a section through one of the first through bores 32 formed in the bearing housing 30 of the bearing device 1. In FIG. 3a, the device according to the invention is already mounted on the engine block, in contrast to the illustration of FIGS. 2a and 2b. To this end, a sleeve-shaped damper member, which has the aforementioned properties, is fitted into the first through bore 32 of the bearing housing 30. In the mounted state, the longitudinal axis of the second through bore 42 formed in the sleeve-shaped damper member 40 coincides with the longitudinal axis of the first through bore 32 in the bearing housing 30, as can be seen from FIG. 3a. A tapped hole 102 into which an assembly bolt 50 is screwed, which in the exemplary embodiment shown is formed as a threaded rod, is provided in the engine block 100. In this case, the threaded rod is secured against inadvertent loosening in the tapped hole 102 in the engine block. The threaded rod 50 is now passed through the second through bore 43 in the damper member 40. A washer 56 is placed on the top side and the housing 30 is fixed on the engine block 100 by means of a nut 52. By limiting the tightening torque of the nut 30, a compression of the damper member 40 that is too large can be avoided safely. The nut 52 itself is secured against inadvertent loosening by a counter nut 54 screwed on contrary to the nut 52.

FIG. 3b shows an alternative embodiment of the damper member 40 which may be used, for example, in connection with the first exemplary embodiment of the bearing device 1 according to the invention according to the FIGS. 2a and 2b. It may, however, also be used in connection with the second exemplary embodiment according to the FIGS. 4a to *c*. In FIG. 3b, instead of a sleeve-shaped damper member 40, two separately formed annular damper members 40, the axis of symmetry of which in turn coincides with the longitudinal axis of the first through bore 32, are disposed in the area of a through bore 32. To ensure that the separately formed annular damper members maintain their intended orientation when the bearing housing 30 is mounted to the engine block 100, the annular damper members 40 each form an annular centering projection 44 which latches into the first through bore 32 in the bearing housing 30. In this case, the separately formed damper members 40 can in this case consist of the same material as the sleeve-shaped damper members according to FIG. 3a.

In a simplified representation. FIG. 4a shows a second exemplary embodiment of a bearing device according to the invention which differs from the first exemplary embodiment substantially because the bearing housing 30 of the device 1 is not fixed directly on the engine block 100. Rather, a bearing housing bracket 34 is provided which is rigidly connected with the engine block 100. The bearing housing 30 is then connected in a vibrationally decoupled way with the bearing housing bracket 34, in the manner already known from the first exemplary embodiment. Since no higher requirements must be made with regard to the fabrication accuracy of the bearing housing bracket 34, the bearing housing bracket 34 may be a simple metallic casting. However, the outer ring 24 of the radial bearing 20 is pressed into the bearing housing 30, just as in the first exemplary embodiment, so that the bearing housing 30 must have an accommodating recess 36 which is processed with corresponding accuracy.

For this reason, the bearing housing 30 may, for example, be manufactured by precision casting. In the second exemplary embodiment, the bearing housing 30 is mechanically fixed on the bearing housing bracket 34 by means of the assembly bolt 50, with damper members 40, which in this case are once again sleeve-shaped and which may correspond to those of the first exemplary embodiment, being completely incorporated into the power train between the bearing housing 30 and the bearing housing bracket 34.

FIG. 4b shows in detail the structure of the bearing device 1 according to the second exemplary embodiment. Among other things, it is apparent from FIG. 4b that the bearing housing bracket 34 itself forms third through bores 38 provided for accommodating further assembly bolts 50 when the bearing housing bracket 34 is mounted to the engine block 100. In an alternative embodiment of the bearing device 1 according to the FIGS. 4a to 4c, damper members 40 of the known type are fitted also into the third through bores 38 of the bearing housing bracket 34, so that the result in this case is a vibrationally decoupled mounting of the bearing housing bracket 34 on the engine block 100. In that case, a vibrationally decoupled mounting of the bearing housing 30 on the bearing housing bracket 34 may possibly be completely dispensed with.

However, there may also be examples of application in which an additional vibrationally decoupled mounting of the bearing housing 30 on the bearing housing bracket 34 exhibits an advantageous effect with regard to the NVH behavior of the intermediate shaft 10.

FIG. 4c once again shows a section through the bearing device 1 according to the second exemplary embodiment, with the cut being executed through the plane of the page of the view according to FIG. 4b.

Finally. FIG. 5 shows a third exemplary embodiment of a bearing device 1 according to the invention, which substantially corresponds to the first exemplary embodiment according to the FIGS. 2, 2a and 2b. The pivotal difference is the design of the bearing housing 30 in two parts, wherein the bearing housing 30 comprises a fixed part 30.0, which comprises an interface for the vibrationally decoupled mounting on the engine block 100 of the motor vehicle. For this purpose, the fixed housing part 30.0 forms a first through bore 32, into which the damper members 40 can be fitted in the manner known from the preceding exemplary embodiments, before the fixed housing part 30.0 is secured to the engine block 100 by means of an assembly bolt 50 passed through the first through bore 32.

The two-part bearing housing 30 also in this exemplary embodiment forms a accommodating recess 36 for the outer ring 24 of the radial bearing 20, wherein the outer ring 24 can, for example, also be fixed in the bearing housing 30 by positive fit, due to the design of the bearing housing 30 in two parts. In particular, this two-part design of the bearing housing 30 is suitable for accommodating the outer ring 24 of the radial bearing 20 in such a way that, though the outer ring 24 is non-rotatably connected with the bearing housing 30, it can nevertheless execute a wobbling movement in the plane of the FIG. 5. This means that the radial bearing 20 on the whole is able to execute a rotational movement about the axes X and Y in FIG. 5, wherein the angular range of the rotational movement can be limited to a few degrees or less. The radial bearing 20 is fixed in the bearing housing 30 by being fitted into the fixed housing part 30.0, and is then fixed by means of the fitted unsupported 30.1 housing part. The unsupported housing part 30.1 is fixated on the fixed housing part 30.0 by means of an assembly bolts 50, for which purpose the unsupported housing part 30.1 forms fourth through bores 39 for accommodating the assembly bolts 50, with tapped holes 33 for bolting the assembly bolts 50 being formed in the fixed housing part 30.0.

The invention claimed is:

1. Bearing device (1) for the vibrationally decoupled rotary mounting of an intermediate shaft (10) on an engine block (100) of a motor vehicle, comprising the following features:
  a. a radial bearing (20) comprising
    i. an inner ring (22) for accommodating the intermediate shaft (10), and
    ii. an outer ring (24), and
  b. a bearing housing (30), which is formed in two parts, and the outer ring (24) of the radial bearing (20) is fixed in a positive fit in the bearing housing (30),
    i. is provided
      1. for attachment on the engine block (100) of the motor vehicle, and
      2. for accommodating the radial bearing (20) in a non-rotatable manner, and
    ii. forms a mechanical interface for attaching the bearing housing (30) on the engine block (100) of the motor vehicle;
  c. wherein the bearing device (1) further comprises at least one rubber-elastic, damper member (40) provided to be disposed in a vibration-damping way between the bearing housing (30) and the engine block (100) when the bearing housing (30) is mounted on the engine block (100); and
  d. wherein the radial bearing (20) fixed in the bearing housing (30) executes a wobbling movement about two axes x, y;
  e. wherein the two axes x, y are oriented perpendicularly relative to the axis of rotation of the intermediate shaft (10);
  f. wherein the outer ring (24) and the bearing housing (30) are immediately adjacent to and abut one another.

2. Bearing device (1) according to claim 1, wherein the at least one rubber-elastic damper member (40) is incorporated into the power train between the bearing housing (30) and the engine block (100), when the bearing housing (30) is mounted on the engine block (100).

3. Bearing device (1) according to claim 2, wherein the bearing device (1) further comprises at least one first through bore (32) provided to accommodate an assembly bolt (50) for fixing the bearing housing (30) on the engine block (100) when the bearing housing (30) is mounted on the engine block (100), and
  a. the at least one rubber-elastic damper member (40) is disposed in the first through bore (32).

4. Bearing device (1) according to claim 3, wherein the at least one rubber-elastic damper member (40) comprises a second through bore (42) for accommodating the assembly bolt (50).

5. Bearing device (1) according to claim 1, wherein the outer ring (24) of the radial bearing (20) is fixed in a force fit in the bearing housing (30).

6. Bearing device (1) according to claim 1, wherein the outer ring (24) of the radial bearing (20) is fixed in the bearing housing (30) by means of a securing element (26).

7. Bearing device (1) according to claim 1, wherein the bearing housing (30) is manufactured from a metallic material by means of casting processes.

8. Bearing device (1) according to claim 1, wherein the device (1) further comprises a bearing housing bracket (34), which
   a. forms a first mechanical interface for attaching the bearing housing bracket (34) on the engine block (100) of the motor vehicle, and
   b. comprises a second mechanical interface for attaching the bearing housing (30) on the bearing housing bracket (34),
   wherein
   c. the at least one rubber-elastic damper member (40) is provided to be disposed in a vibration-damping way between the bearing housing (30) and the bearing housing bracket (34) when the bearing housing (30) is mounted on the engine block (100).

9. Bearing device (1) according to claim 1, wherein the at least one rubber-elastic damper member (40) has a hardness which lies in the interval between 10 and 100 shore A.

10. Bearing device (1) according to claim 9, wherein the at least one damper member (40) has a hardness which lies in the interval between 20 and 60 shore A.

11. Bearing device (1) according to claim 1, wherein the first natural frequency of the vibratory system consisting of the intermediate shaft (10), a drive shaft (200), a drive wheel (250) and the bearing device (1) lies below 50 Hertz.

12. Bearing device (1) according to claim 11, wherein the first natural frequency of the vibratory system consisting of the intermediate shaft (10), the drive shaft (200), the drive wheel (250) and the bearing device (1) lies below 30 Hertz.

13. Bearing device (1) according to claim 1, wherein the at least one rubber-elastic damper member (40) is temperature-resistant to 160° C.

14. Bearing device (1) according to claim 13, wherein the at least one rubber-elastic damper member (40) is temperature-resistant to 180° C.

15. Method for the vibrationally decoupled rotary mounting of an intermediate shaft (10) on an engine block (100) of a motor vehicle, comprising the following steps:
   a. providing a bearing device (1), which comprises the following:
      i. a radial bearing (20) with an inner ring (22) for accommodating the intermediate shaft (10), and with an outer ring (24),
      ii. a bearing housing (30) provided for attachment on the engine block (100) of the motor vehicle and for accommodating the radial bearing (20) in a non-rotatable manner, and which forms a mechanical interface for the attachment of the bearing housing (30) on the engine block (100) of the motor vehicle, the bearing housing formed in two parts, and the outer ring (24) of the radial bearing (20) is fixed in a positive fit in the bearing housing (30), the radial bearing (20) fixed in the bearing housing (30) able to execute a wobbling movement about two axes x, y, and
      iii. at least one rubber-elastic damper member;
      iv. wherein the two axes x, y are oriented perpendicularly relative to the axis of rotation of the intermediate shaft (1);
      v. wherein the outer ring (24) and the bearing housing (3) are immediately adjacent to and abut one another; and
   b. mounting the bearing housing (30) on the engine block (100) of the motor vehicle, wherein the at least one rubber-elastic damper member (40) is disposed in a vibration-damping way between the bearing housing (30) and the engine block (100).

16. Method according to claim 15, wherein the at least one rubber-elastic damper member (40) is selected such that the first natural frequency of the vibratory system comprising of the intermediate shaft (10), the drive shaft (200), the drive wheel (250) and the bearing device (1) lies below 50 Hertz.

17. Method according to claim 15, wherein the at least one rubber-elastic damper member (40) is selected such that the first natural frequency of the vibratory system comprising of the intermediate shaft (10), the drive shaft (200), the drive wheel (250) and the bearing device (1) lies below 30 Hertz.

* * * * *